United States Patent
Levine et al.

(10) Patent No.: US 10,460,341 B2
(45) Date of Patent: *Oct. 29, 2019

(54) SYSTEM AND METHOD FOR OFFER TARGETING

(71) Applicant: JPMorgan Chase Bank, N.A., New York, NY (US)

(72) Inventors: Adam Michael Levine, Wilmington, DE (US); Nagendra Krishnamurthy Bellur, Wilmington, DE (US); Sourabh Pisolkar, New Castle, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 695 days.

This patent is subject to a terminal disclaimer.

(21) Appl. No.: 13/847,559

(22) Filed: Mar. 20, 2013

(65) Prior Publication Data

US 2013/0218673 A1    Aug. 22, 2013

Related U.S. Application Data

(63) Continuation of application No. 10/869,904, filed on Jun. 18, 2004, now Pat. No. 8,429,006.

(51) Int. Cl.
| | | |
|---|---|---|
| G06Q 30/00 | (2012.01) | |
| G06Q 30/02 | (2012.01) | |
| G06Q 30/04 | (2012.01) | |

(52) U.S. Cl.
CPC ..... *G06Q 30/0251* (2013.01); *G06Q 30/0207* (2013.01); *G06Q 30/0249* (2013.01); *G06Q 30/04* (2013.01)

(58) Field of Classification Search
CPC ............. G06Q 90/00; G06Q 30/0251; G06Q 30/0207; G06Q 30/04; G06Q 30/0249

(Continued)

(56) References Cited

U.S. PATENT DOCUMENTS

| 3,634,669 A | 1/1972 | Soumas et al. |
| 4,047,033 A | 9/1977 | Malmberg et al. |

(Continued)

FOREIGN PATENT DOCUMENTS

| CA | 2293321 | 12/1998 |

OTHER PUBLICATIONS

Welcome to Card Express, The CardEx Incentive Card, as disclosed in the CardEx web site. archived by web.archive.org on Feb. 7, 1998 [http://web.archive.org/web/*/http://www.cardex.com], retrieve Oct. 18, 2003, 8 pages.

(Continued)

*Primary Examiner* — Raquel Alvarez
(74) *Attorney, Agent, or Firm* — Greenblum & Bernstein, P.L.C.

(57) ABSTRACT

A system and method for offer targeting is disclosed. According to one embodiment, a method for offer targeting may comprise: providing a plurality of offers and a plurality of groups, wherein each group comprises one or more accounts; maintaining an offer counter for each of the plurality of groups; and assigning the plurality of offers, in a predetermined order, to the plurality of groups by repeating the following steps: (1) assigning an offer to one or more groups, wherein the one or more groups are selected from groups that are pre-qualified for the offer based on a plurality of business rules, and the selection of the one or more groups is based at least in part on the offer counters of the one or more groups; (2) incrementing offer counters associated with the one or more groups; and (3) sorting the plurality of groups based on the incremented offer counters.

17 Claims, 3 Drawing Sheets

(58) Field of Classification Search
USPC ...... 705/14.1, 14.4, 14.8, 14.49, 35; 75/14.1
See application file for complete search history.

(56) References Cited

U.S. PATENT DOCUMENTS

| | | | |
|---|---|---|---|
| 4,254,474 A | 3/1981 | Cooper et al. | |
| 4,346,442 A | 8/1982 | Musmanno | |
| 4,355,372 A | 10/1982 | Johnson et al. | |
| 4,376,978 A | 3/1983 | Musmanno | |
| 4,545,838 A | 10/1985 | Minkus et al. | |
| 4,582,985 A | 4/1986 | Lofberg | |
| 4,594,663 A | 6/1986 | Nagata et al. | |
| 4,597,046 A | 6/1986 | Musmanno et al. | |
| 4,598,367 A | 7/1986 | DeFrancesco et al. | |
| 4,634,845 A | 1/1987 | Hale et al. | |
| 4,642,768 A | 2/1987 | Roberts | |
| 4,674,044 A | 6/1987 | Kalmus et al. | |
| 4,700,055 A | 10/1987 | Kashkashian, Jr. | |
| 4,736,294 A | 4/1988 | Gill et al. | |
| 4,739,478 A | 4/1988 | Roberts et al. | |
| 4,750,119 A | 6/1988 | Cohen et al. | |
| 4,760,604 A | 7/1988 | Cooper et al. | |
| 4,766,293 A | 8/1988 | Boston | |
| 4,774,663 A | 9/1988 | Musmanno et al. | |
| 4,831,242 A | 5/1989 | Englehardt et al. | |
| 4,831,526 A | 5/1989 | Luchs et al. | |
| 4,866,634 A | 9/1989 | Reboh et al. | |
| 4,882,675 A | 11/1989 | Nichtberger et al. | |
| 4,897,533 A | 1/1990 | Lyszczarz | |
| 4,897,811 A | 1/1990 | Scofield | |
| 4,906,826 A | 3/1990 | Spencer | |
| 4,953,085 A | 8/1990 | Atkins | |
| 4,972,504 A | 11/1990 | Daniel, Jr. et al. | |
| 4,978,401 A | 12/1990 | Bonomi | |
| 5,025,372 A | 6/1991 | Burton et al. | |
| 5,041,972 A | 8/1991 | Frost | |
| 5,080,748 A | 1/1992 | Bonomi | |
| 5,095,194 A | 3/1992 | Barbanell | |
| 5,117,355 A | 5/1992 | McCarthy | |
| 5,175,416 A | 12/1992 | Mansvelt et al. | |
| 5,180,901 A | 1/1993 | Hiramatsu | |
| 5,192,947 A | 3/1993 | Neustein | |
| 5,202,826 A | 4/1993 | McCarthy | |
| 5,218,631 A | 6/1993 | Katz | |
| 5,220,500 A | 6/1993 | Baird et al. | |
| 5,227,874 A | 7/1993 | Von Kohorn | |
| 5,231,571 A | 7/1993 | D'Agostino | |
| 5,276,311 A | 1/1994 | Hennige | |
| 5,278,751 A | 1/1994 | Adiano et al. | |
| 5,287,268 A | 2/1994 | McCarthy | |
| 5,287,269 A | 2/1994 | Dorrough et al. | |
| 5,297,026 A | 3/1994 | Hoffman | |
| 5,297,032 A | 3/1994 | Trojan et al. | |
| 5,311,594 A | 5/1994 | Penzias | |
| 5,326,960 A | 7/1994 | Tannenbaum | |
| 5,339,239 A | 8/1994 | Manabe et al. | |
| 5,349,633 A | 9/1994 | Katz | |
| 5,350,906 A | 9/1994 | Brody et al. | |
| 5,365,575 A | 11/1994 | Katz | |
| 5,397,881 A | 3/1995 | Mannik | |
| 5,424,524 A | 6/1995 | Ruppert et al. | |
| 5,444,844 A | 8/1995 | Inoue et al. | |
| 5,450,477 A | 9/1995 | Amarant et al. | |
| 5,459,306 A | 10/1995 | Stein et al. | |
| 5,465,206 A | 11/1995 | Hilt et al. | |
| 5,466,919 A | 11/1995 | Hovakimian | |
| 5,471,669 A | 11/1995 | Lidman | |
| 5,477,038 A | 12/1995 | Levine et al. | |
| 5,479,494 A | 12/1995 | Clitherow | |
| 5,481,094 A * | 1/1996 | Suda .................. | G06Q 20/387 235/383 |
| 5,481,647 A | 1/1996 | Brody et al. | |
| 5,482,139 A | 1/1996 | Rivalto | |
| 5,483,444 A | 1/1996 | Heintzeman et al. | |
| 5,490,060 A | 2/1996 | Malec et al. | |
| 5,500,514 A | 3/1996 | Veeneman et al. | |
| 5,511,114 A | 4/1996 | Stimson et al. | |
| 5,521,363 A | 5/1996 | Tannenbaum | |
| 5,523,942 A | 6/1996 | Tyler et al. | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,551,021 A | 8/1996 | Harada et al. | |
| 5,553,120 A | 9/1996 | Katz | |
| 5,577,109 A | 11/1996 | Stimson et al. | |
| 5,578,808 A | 11/1996 | Taylor | |
| 5,583,778 A | 12/1996 | Wind | |
| 5,585,787 A | 12/1996 | Wallerstein | |
| 5,590,038 A | 12/1996 | Pitroda | |
| 5,592,590 A | 1/1997 | Jolly | |
| 5,603,025 A | 2/1997 | Tabb et al. | |
| 5,606,496 A | 2/1997 | D'Agostino | |
| 5,608,785 A | 3/1997 | Kasday | |
| 5,611,052 A | 3/1997 | Dykstra et al. | |
| 5,621,787 A | 4/1997 | McKoy et al. | |
| 5,637,845 A | 6/1997 | Kolls | |
| 5,644,727 A | 7/1997 | Atkins | |
| 5,649,116 A | 7/1997 | McCoy et al. | |
| 5,649,118 A | 7/1997 | Carlisle et al. | |
| 5,655,085 A | 8/1997 | Ryan et al. | |
| 5,664,110 A | 9/1997 | Green et al. | |
| 5,671,363 A | 9/1997 | Cristofich et al. | |
| 5,675,607 A | 10/1997 | Alesio et al. | |
| 5,677,955 A | 10/1997 | Doggett et al. | |
| 5,689,100 A | 11/1997 | Carrithers et al. | |
| 5,689,650 A | 11/1997 | McClelland et al. | |
| 5,703,344 A | 12/1997 | Bezy et al. | |
| 5,708,422 A | 1/1998 | Blonder et al. | |
| 5,710,886 A | 1/1998 | Christensen et al. | |
| 5,715,399 A | 2/1998 | Bezos | |
| 5,717,865 A | 2/1998 | Stratmann | |
| 5,721,768 A | 2/1998 | Stimson et al. | |
| 5,727,153 A | 3/1998 | Powell | |
| 5,729,693 A | 3/1998 | Holda-Fleck | |
| 5,732,397 A | 3/1998 | DeTore et al. | |
| 5,737,421 A | 4/1998 | Audebert et al. | |
| 5,745,706 A | 4/1998 | Wolfberg et al. | |
| 5,758,328 A | 5/1998 | Giovannoli | |
| 5,760,381 A | 6/1998 | Stich et al. | |
| 5,765,141 A | 6/1998 | Spector | |
| 5,765,144 A | 6/1998 | Larche et al. | |
| 5,770,843 A | 6/1998 | Rose et al. | |
| 5,774,870 A | 6/1998 | Storey | |
| 5,774,878 A | 6/1998 | Marshall | |
| 5,774,883 A | 6/1998 | Andersen et al. | |
| 5,777,305 A | 7/1998 | Smith et al. | |
| 5,777,306 A | 7/1998 | Masuda et al. | |
| 5,787,156 A | 7/1998 | Katz | |
| 5,787,404 A | 7/1998 | Fernandez-Holmann | |
| 5,802,176 A | 9/1998 | Audebert et al. | |
| 5,802,502 A | 9/1998 | Gell et al. | |
| 5,806,042 A | 9/1998 | Kelly et al. | |
| 5,835,576 A | 11/1998 | Katz | |
| 5,842,178 A | 11/1998 | Giovannoli | |
| 5,845,259 A | 12/1998 | West et al. | |
| 5,852,811 A | 12/1998 | Atkins | |
| 5,857,079 A | 1/1999 | Claus et al. | |
| 5,857,709 A | 1/1999 | Chock | |
| 5,859,419 A | 1/1999 | Wynn | |
| 5,864,609 A | 1/1999 | Cross et al. | |
| 5,864,828 A | 1/1999 | Atkins | |
| 5,864,830 A | 1/1999 | Armetta et al. | |
| 5,870,718 A | 2/1999 | Spector | |
| 5,870,721 A | 2/1999 | Norris | |
| 5,873,096 A | 2/1999 | Lim et al. | |
| 5,875,437 A | 2/1999 | Atkins | |
| 5,878,258 A | 3/1999 | Pizi et al. | |
| 5,878,403 A | 3/1999 | DeFrancesco et al. | |
| 5,883,810 A | 3/1999 | Franklin et al. | |
| 5,884,285 A | 3/1999 | Atkins | |
| 5,887,065 A | 3/1999 | Audebert | |
| 5,911,135 A | 6/1999 | Atkins | |

(56) References Cited

U.S. PATENT DOCUMENTS

| | | |
|---|---|---|
| 5,911,136 A | 6/1999 | Atkins |
| 5,913,202 A | 6/1999 | Motoyama |
| 5,918,217 A | 6/1999 | Maggioncalda et al. |
| 5,920,848 A | 7/1999 | Schutzer et al. |
| 5,926,800 A | 7/1999 | Baronowski et al. |
| 5,930,217 A | 7/1999 | Kayanuma et al. |
| 5,930,775 A | 7/1999 | McCauley et al. |
| 5,937,068 A | 8/1999 | Audebert |
| 5,940,811 A | 8/1999 | Norris |
| 5,940,812 A | 8/1999 | Tengel et al. |
| 5,940,844 A | 8/1999 | Cahill et al. |
| 5,950,175 A | 9/1999 | Austin |
| 5,955,961 A | 9/1999 | Wallerstein |
| 5,963,953 A | 10/1999 | Cram et al. |
| 5,970,467 A | 10/1999 | Alavi |
| 5,970,480 A | 10/1999 | Kalina |
| 5,974,396 A | 10/1999 | Anderson et al. |
| 5,974,399 A | 10/1999 | Giuliani et al. |
| 5,978,779 A | 11/1999 | Stein et al. |
| 5,987,434 A | 11/1999 | Libman |
| 5,991,750 A | 11/1999 | Watson |
| 5,995,942 A | 11/1999 | Smith et al. |
| 6,000,608 A | 12/1999 | Dorf |
| 6,000,832 A | 12/1999 | Franklin et al. |
| 6,009,415 A | 12/1999 | Shurling et al. |
| 6,014,645 A | 1/2000 | Cunningham |
| 6,016,954 A | 1/2000 | Abe et al. |
| 6,018,722 A | 1/2000 | Ray et al. |
| 6,021,397 A | 2/2000 | Jones et al. |
| 6,026,370 A | 2/2000 | Jermyn |
| 6,029,139 A | 2/2000 | Cunningham et al. |
| 6,032,125 A | 2/2000 | Ando |
| 6,032,136 A | 2/2000 | Brake, Jr. et al. |
| 6,036,099 A | 3/2000 | Leighton |
| 6,038,552 A | 3/2000 | Fleischl et al. |
| 6,044,371 A | 3/2000 | Person et al. |
| 6,055,510 A | 4/2000 | Henrick et al. |
| 6,070,147 A | 5/2000 | Harms et al. |
| 6,070,153 A | 5/2000 | Simpson |
| 6,078,892 A | 6/2000 | Anderson et al. |
| 6,088,686 A | 7/2000 | Walker et al. |
| 6,105,865 A | 8/2000 | Hardesty |
| 6,108,641 A | 8/2000 | Kenna et al. |
| 6,128,598 A | 10/2000 | Walker et al. |
| 6,128,599 A | 10/2000 | Walker et al. |
| 6,164,533 A | 12/2000 | Barton |
| 6,167,385 A | 12/2000 | Hartley-Urquhart |
| 6,173,270 B1 | 1/2001 | Cristofich et al. |
| 6,188,993 B1 | 2/2001 | Eng et al. |
| 6,189,787 B1 | 2/2001 | Dorf |
| 6,199,077 B1 | 3/2001 | Inala et al. |
| 6,202,053 B1 | 3/2001 | Christiansen et al. |
| 6,227,447 B1 | 5/2001 | Campisano |
| 6,243,688 B1 | 6/2001 | Kalina |
| 6,249,775 B1 | 6/2001 | Freeman et al. |
| 6,269,346 B1 | 7/2001 | Cristofich et al. |
| 6,308,268 B1 | 10/2001 | Audebert |
| 6,321,212 B1 | 11/2001 | Lange |
| 6,338,047 B1 | 1/2002 | Wallman |
| 6,341,724 B2 | 1/2002 | Campisano |
| 6,345,261 B1 | 2/2002 | Feidelson et al. |
| 6,373,969 B1 | 4/2002 | Adler et al. |
| 6,429,927 B1 | 8/2002 | Borza et al. |
| 6,434,259 B1 | 8/2002 | Hamid et al. |
| 6,446,210 B1 | 9/2002 | Borza et al. |
| 6,498,861 B1 | 12/2002 | Hamid et al. |
| 6,502,080 B1 | 12/2002 | Eichorst et al. |
| 6,601,044 B1 | 7/2003 | Wallman |
| 6,615,189 B1 | 9/2003 | Phillips et al. |
| 6,641,050 B2 | 11/2003 | Kelley et al. |
| 6,836,763 B1* | 12/2004 | Munsil ............ B41L 13/06 229/314 |
| 8,429,006 B1* | 4/2013 | Levine et al. ............ 705/14.1 |
| 2002/0026356 A1* | 2/2002 | Bergh ............ G06Q 10/10 705/14.53 |
| 2002/0151294 A1* | 10/2002 | Kirby ............ G06Q 30/02 455/406 |
| 2002/0161611 A1* | 10/2002 | Price ............ G06Q 30/0281 705/346 |
| 2002/0174011 A1* | 11/2002 | Sanchez ............ G06Q 20/387 705/14.25 |
| 2003/0064788 A1* | 4/2003 | Walker ............ G07F 17/32 463/20 |
| 2003/0110119 A1 | 6/2003 | Crites |
| 2004/0103051 A1* | 5/2004 | Reed ............ G06Q 30/02 705/36 R |
| 2004/0236607 A1* | 11/2004 | Kost ............ G06Q 10/10 705/2 |
| 2005/0261959 A1* | 11/2005 | Moyer ............ G06Q 30/02 705/14.21 |

OTHER PUBLICATIONS

Welcome to Card Express, CardEx web site archived by web.archive.org on Oct. 31, 1996 [http://web.archive.org/web/*/http://www.cardex.com], retrieve Oct. 18, 2003, 7 pages.
CardEx Incentives, Apr. 6, 1999, www.cardexco.com, 15 pages.
"Associates First Capital Corporation", Hoover's Inc., The Industry Standard: The Newsmagazine of the Internet Economy, thestandard.net/companies/cpmpany-display, Apr. 6, 1999, 2 pages.
Jeffrey M. Lacker, "Stored Value Cards: Costly Private Substitutions for Government Currency", Economic Quaterly, 1996, 9 pages.
"The Evolution of a New Consumerism", Chain Store Age, vol. 73, pp. 8-9, Jun. 1997, 4 pages.
Lisa Fickenscher, "Amex prepaid offering is latest card for firms regarding employees", American Banker, vol. 161, No. 151, Aug. 8, 1996, 2 pages.
"Welcome to Swiftgift", Swiftgift, www.swiftgiftcard.com, Dec. 8, 1998, 10 pages.
Lucy Lzarony, "Stuck for a gift? Give a prepaid credit card", www.bankrate.com, Dec. 21, 1998, 2 pages.
Antoinette Coulton, "Incentives field moving to card-based series 14", American Banker, Mar. 26, 1998, 3 pages.
Credit Card News, "A store card issuer looks for lift from electronic gift certificates", Feb. 1, 1995, 2 pages.
Business Travel News, "Maritz gets mastercard's stamp of approval", Aug. 19, 1996, 2 pages.
Debit Card News, vol. 2, Issue 2, "Boatman's floats stored value into the employee incentive waters", Jul. 16, 1996, 3 pages.
Mickey Meece, "Boatman's prepaid cards for worker-incentive firm", American Banker, Jul. 2, 1996, 1 page.
Card News, vol. 6, No. 25, "D.C. Area Safeway stores look for increase in sales volume and revenue with cards", Dec. 1991, 3 pages.
Spurgin, "Sopininmon! or What's happening in the retail credit card environment", Credit World Journal, Apr. 1997, 7 pages.
AT&T Marketing, "Universal card free lifetime membership extended 3 months", www.att.com/press/0297/970217.csa.html, Dec. 4, 1990, 2 pages.
Chain Store Age Executive with Shopping Center Age, "More retailers turn to co-branding", Feb. 1, 1995, 3 pages.
Introducing SpendingMoney(TM), Armetta: Marketing & Design Product Concept Report, Oct. 9, 1996, 15 pages.
First USA Platinum Connect, First USA Bank, First USA Promotional Mailing, Oct. 1997, 6 pages.
Introducing the First USA Platinum Connect Card, First USA PromotionalMailing, Dec. 1997, 6 pages.
Here's the calling convenience you asked for: 1-800-call-AT&T. . . For All Calls, Appendix A: For Card Carriers, 7 pages.
Beth Piskora, Debit Cards Seen Poised for New Markets, American Banker, pp. 16, Mar. 7, 1995, 1 page.
Nick Rosen, Cash Just Isn't Flexible Enough: Shops of the Future Will Only Take Cards, Daily Express: Technology Section, Feb. 10, 1995, 1 page.
Phil Britt, Competing in Auto Lending, America's Community Banker, vol. 5, No. 11, pp. 33-37, Nov. 1, 1996, 7 pages.

(56) References Cited

OTHER PUBLICATIONS

Miriam Krenin Souccar, Smart Cards: 1st Union Smart Card Pilot Enlists a Second Army Base, American Banker, 3 pages.
First Union Issues Smart Cards to Fort Benning Recruits, CardFax, 1 page.
Emerson Brown and Jim Baum, Purchasing Card Magic: Eli Lilly Finds Accounts Payable Flying High With Plastic, Corporate Cashflow, 4 pages.
Christine Dugas, Payroll May Ask: Paper or Plastic?, USA Today, 3B, Aug. 14, 2001, 1 page.
Cards International Jan. 30, 1996, First Data markets stored-value cards, 2 pages.
Business Wire, Jan. 15, 1996, CES/NaBANCO introduces stored value card technology; blockbuster video is first merchant partner, 2 pages.
Melinda Norris, et al., Omaha World Herald, Jan. 19, 1996, Sunrise Edition, First data unit develops blockbuster cash card, 2 pages.
Valerie Block, The American Banker, Sep. 1, 1995, Blockbuster running test of a stored value card, 2 pages.
Sora Song, A card that asks for ID, Monday, Apr. 12, 2004, Time Magazine, 1 page.
Rachel Konrad, Associated Press, IBM had a bunch of unusual ideas in 2003, printed from Philly.com on Jan. 21, 2004, posted on Tues., Jan. 13, 2004, 2 pages.
Incentive firms debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.
News Release, For Release: Monday, Feb. 17, 1997, New 1-800-CALL-ATT campaign promotes one number for all calls, 2 pages.
S. P. Miller et al., Section E.2.1: Kerberos Authentication and Authorization System, Project Athena, Cambridge, Massachusetts, Dec. 21, 1987, 39 pages.
Swift Gift 'Wows' Internet Shoppers, Wed., Dec. 2, 1998, PR Newswire, 2 pages (Author Unknown).

\* cited by examiner

Figure 1

Offer Item 1

Offer Item 2

Offer Item 3

Offer Item 4

Offer Item 5

Offer Item 6

Figure 3

Sub-step 1

|       | Offer Counter | Total Accounts |
|-------|---------------|----------------|
| AOC 1 | 1             | 100,000        |
| AOC 2 | 0             | 100,000        |
| AOC 3 | 0             | 100,000        |
| AOC 4 | 3             | 100,000        |
| AOC 5 | 1             | 100,000        |
| AOC 6 | 0             | 100,000        |

Sub-step 2

|       | Offer Counter | Total Accounts |
|-------|---------------|----------------|
| AOC 2 | 0             | 100,000        |
| AOC 3 | 0             | 100,000        |
| AOC 6 | 0             | 100,000        |
| AOC 5 | 1             | 100,000        |
| AOC 1 | 1             | 100,000        |
| AOC 4 | 3             | 100,000        |

Sub-step 3

|       | Offer Counter | Total Accounts | Lift Percentage | Available Accounts |
|-------|---------------|----------------|-----------------|--------------------|
| AOC 2 | 0             | 100,000        | 0.8             | 80,000             |
| AOC 3 | 0             | 100,000        | 0.8             | 80,000             |
| AOC 6 | 0             | 100,000        | 0.8             | 80,000             |
| AOC 5 | 1             | 100,000        | 0.5             | 50,000             |
| AOC 1 | 1             | 100,000        | 0.5             | 50,000             |
| AOC 4 | 3             | 100,000        | 0.1             | 10,000             |

SYSTEM AND METHOD FOR OFFER TARGETING

RELATED APPLICATIONS

This application is a Continuation Application of U.S. patent application Ser. No. 10/869,904, filed on Jun. 18, 2004.

FIELD OF THE INVENTION

The present invention relates generally to business communication and marketing. More particular the present invention relates to a system and method for offer targeting.

BACKGROUND OF THE INVENTION

A financial company typically mails statements to its credit card members or banking customers on a monthly basis. The financial company may also frequently mail credit cards or banking cards to the customers for re-issues or replacements. In addition, the company may occasionally send letters to current or potential customers for various purposes. Millions of mail pieces are produced and delivered every month for these purposes. Though a costly process, mailing of the statements, cards and letters creates a valuable opportunity for the company and its partners to promote products and services to the customers. These mail pieces are usually guaranteed to reach a large number of families or individuals and are much more likely to receive attention than other types of mass mailings. Companies have long been taking advantage of this communication channel by including advertisements and solicitations in the outgoing statements or letters. These advertisements or solicitations or the like (hereinafter collectively referred to as "offers") may take the form of a message, an insert, a billhead, a convenience check, an inner envelope or an outer envelope, for example. An offer typically describes a specific promotional program (e.g., one related to a financial or insurance product) that is offered by a business entity and is usually targeted at a specific group of customers.

It is a demanding task to manage offers and to incorporate them into outgoing mail pieces. For any given month, a large financial company may typically target hundreds of offers at millions of customers based on complex business rules. These offers need to be properly created together with associated rules, matched to appropriate accounts, produced on a variety of paper stocks, and inserted into outgoing mail pieces. This same or similar process is typically repeated several times ("cycles") each month. The large volumes of mail pieces require considerable investment of resources, the successful return of which depends heavily on the accuracy, efficiency and consistency in the offer management process.

Figure 1:
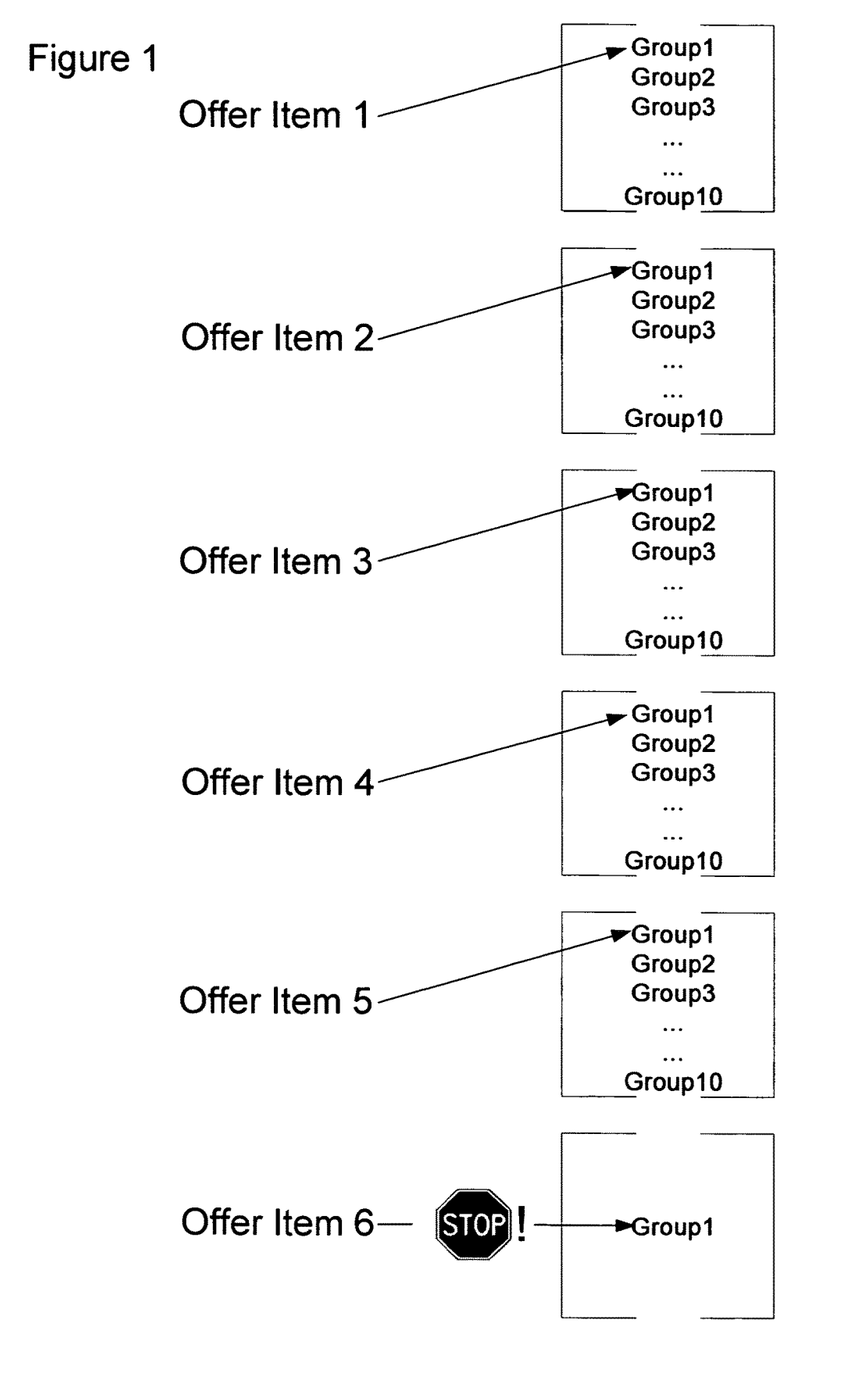
FIG. 1 is a flow chart illustrating an existing problem with offer targeting.

A number of solutions exist for targeting various offers at a large number of accounts or portfolios. However, they typically fail to provide an algorithm that can consistently match the actual number of offer insertions with the requested volume for each offer. As a result, "over-targeting" and "under-targeting" of offers can occur, wherein high-priority offers are targeted to too many customers while low-priority offers reach very few customers. One example of such problem is illustrated in FIG. 1 wherein there are six offer items (Offer Item 1-6) for targeting at various customer groups (Group1-Group10). The customer groups listed in each bracket are those that are qualified to receive the corresponding offer item. Note that only Group1 is qualified for Offer Item 6. If each group may receive a maximum of five offers and the offer items are assigned in the order of their item numbers, Offer Item 6, being the last offer assigned, will not be assigned to any group at all. By the time Offer Item 6 is processed, Group1 will already have been assigned five offers and there is no space left for Offer Item 6. This is just one scenario of under-targeting for low-priority offers.

Other problems and drawbacks also exist.

In view of the foregoing, it would be desirable to provide a solution for offer targeting which overcomes the above-described deficiencies and shortcomings.

SUMMARY OF THE INVENTION

One embodiment of the present invention comprises a method for offer targeting. The method may comprise providing a plurality of offers and a plurality of groups, wherein each of the plurality of groups comprises one or more accounts. The method may also comprise maintaining an offer counter for each of the plurality of groups. The method may further comprise assigning the plurality of offers, in a predetermined order, to the plurality of groups by repeating the following steps: (1) assigning an offer to one or more groups, wherein the one or more groups are selected from groups that are pre-qualified for the offer based on a plurality of business rules, and the selection of the one or more groups is based at least in part on the offer counters of the one or more groups; (2) incrementing offer counters associated with the one or more groups; and (3) sorting the plurality of groups based on the incremented offer counters.

Another embodiment of the present invention comprises a system for offer targeting. The system may comprise means for providing a plurality of offers and a plurality of groups, wherein each of the plurality of groups comprises one or more accounts. The system may also comprise means for maintaining an offer counter for each of the plurality of groups. The system may further comprise means for assigning the plurality of offers, in a predetermined order, to the plurality of groups by repeating the following steps: (1) assigning an offer to one or more groups, wherein the one or more groups are selected from groups that are pre-qualified for the offer based on a plurality of business rules, and the selection of the one or more groups is based at least in part on the offer counters of the one or more groups; (2) incrementing offer counters associated with the one or more groups; and (3) sorting the plurality of groups based on the incremented offer counters. A further embodiment of the present invention comprises a computer readable medium having code for causing at least one processor to perform offer targeting. The computer readable medium may comprise code adapted to provide a plurality of offers and a plurality of groups, wherein each of the plurality of groups comprises one or more accounts. The computer readable medium may also comprise code adapted to maintain an offer counter for each of the plurality of groups. The computer readable medium may further comprise code adapted to assign the plurality of offers, in a predetermined order, to the plurality of groups by repeating the following steps: (1) assigning an offer to one or more groups, wherein the one or more groups are selected from groups that are pre-qualified for the offer based on a plurality of business rules, and the selection of the one or more groups is based at least in part on the offer counters of the one or more groups; (2) incrementing offer counters associated with the one or more groups; and (3) sorting the plurality of groups based on the incremented offer counters.

A still further embodiment of the present invention comprises a method for offer targeting. The method may comprise providing a plurality of offers and a plurality of groups, wherein each of the plurality of groups comprises one or more accounts, each of the plurality of offers is to be assigned to at least a predetermined number of accounts, and at least part of the plurality of offers are associated with one or more financial products or insurance products. The method may also comprise maintaining an offer counter for each of the plurality of groups. The method may further comprise assigning the plurality of offers, in a predetermined order associated with prioritization rankings of the plurality of offers, to the plurality of groups by repeating the following steps: (1) assigning an offer to one or more groups, wherein the one or more groups are selected from groups that are pre-qualified for the offer based on a plurality of business rules, and the selection of the one or more groups is based at least in part on the offer counters of the one or more groups, such that a first group with a higher offer counter value has a lower priority in receiving a subsequently assigned offer than a second group with a lower offer counter value; (2) incrementing offer counters associated with the one or more groups; (3) sorting the plurality of groups based on the incremented offer counters; and (4) modifying the number of available accounts within at least one of the one or more groups based on a predetermined lift percentage, wherein the predetermined lift percentage is associated with the offer counter value of the at least one of the one or more groups. The offer targeting may be performed one or more times for a predetermined time period and the offer counter for each of the plurality of groups is maintained for the predetermined time period.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

Reference will now be made in detail to embodiments of the invention, examples of which are illustrated in the accompanying drawings.

Figure 2:
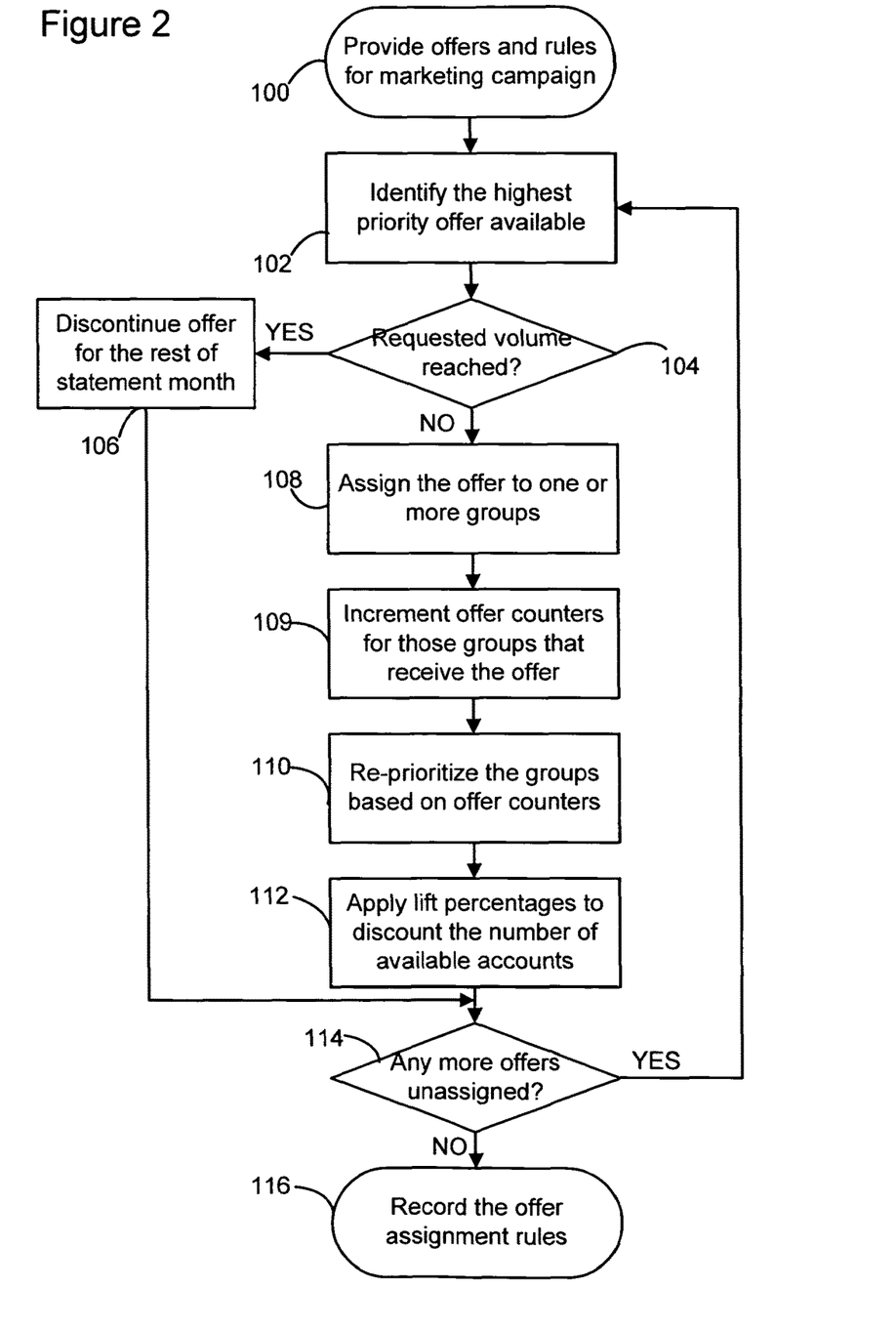
FIG. 2 is a flow chart illustrating an exemplary method for offer targeting according to an embodiment of the present invention.

Referring to FIG. 2, there is shown a flow chart illustrating an exemplary method for offer targeting according to an embodiment of the present invention.

In step 100, a number of offers and their related business rules may be provided for a marketing campaign. The offer items may include information of financial products and services, insurance products and related programs, for example. The offers are typically designed to target various customer populations based on the related business rules. The offers and rules may be on a partner level, a portfolio level, an individual account level or a combination thereof. For example, customer accounts that are associated with a particular business partner may be grouped accordingly. A portfolio typically includes one or more partner groups that share an association with a common business program. For illustration purposes, a plurality of accounts that belong to either a partner group or a portfolio will be hereinafter referred to collectively as a "group." A group may be identified with an account organization code (AOC) and an individual account may be identified with an account reference number (ARN). Offers may be targeted at an entire group without concerning characteristics of individual accounts within the group, for example. Or offers may be targeted at individual accounts regardless of which groups they belong to. For illustration purposes, only group-level offer targeting will be described. However, it should be appreciated that the exemplary system and method may be applied to account-level offer targeting as well.

In step 102, an available offer with the highest priority may be identified. For a predetermined time period (e.g., a statement month), all the offers may be prioritized based on offer categories, contractual obligations and/or market evaluations. The offers may be processed in the order of their priority rankings. Each time, an offer with the highest priority ranking among the remaining pool of offers may be selected for processing.

Then in step 104, it may be determined whether the requested targeting volume has been reached for the selected offer. In a typical marketing campaign, there is usually a request for an offer to be targeted at a certain number of accounts in a statement month, for example. Accordingly, a record may be maintained to keep track of how many accounts each offer has already targeted in the statement month. If it is determined that the selected offer has already been targeted at enough accounts as requested by the marketing personnel, the selected offer may be discontinued (i.e., marked as unavailable), in step 106, for the rest of the statement month. The process may then jump forward to step 114.

If, however, the selected offer has not yet hit the requested targeting volume, the offer may be assigned to one or more qualified groups in step 108. According to embodiments of the invention, all the groups that qualify for any particular offer may be identified based on the offer rules and organized into a group associated with that offer. Thus, the selected offer may be assigned to one or more qualified groups selected from one such group associated with the selected offer. Selection of the one or more qualified groups may be based on their offer counter rankings within the group. According to embodiments of the invention, an offer counter may be maintained for each group to keep track of the number of offers it has received in a predetermined time period such as a statement month. Whenever an offer is assigned to a group, the offer counter for this group may be incremented. Selection of qualified groups for the selected offer may follow the rule that a group with a lower offer counter has a higher priority in receiving offers than another group with a higher offer counter.

In step 109, those groups that receive the selected offer may have their offer counters incremented.

In step 110, all the groups may be re-prioritized based on their offer counters. Since some of the groups now have their offer counter incremented in the preceding step, all the groups may be re-sorted to have their offer counter rankings updated.

In step 112, lift percentages may be applied to discount the number of available accounts in the groups. A lift percentage is a statistical factor, with a typical value between zero and one, which is used to account for a variance between the number of offers that an account is assigned and the number of offers that are actually inserted in the account statement. There is typically an upper limit for the number of offers each account may receive. For a statement channel, this is due to a postage weight limit. Some assigned offers will be excluded when such weight limit is imposed. Therefore, it may be desirable, in the offer assignment stage, to treat a group with a higher offer counter as having fewer available accounts than another group with a lower offer counter. For this purpose, the lift percentages may be derived in advance from analysis of past offer targeting performance. In applying a lift percentage to a group, the total number of accounts in the group may be multiplied by the lift percentage and the resulting number represents the number of accounts that remain available for offer targeting. In other words, this number reflects an estimate of how many accounts within the group eventually end up being inserted in statements or letters after weight management is applied. According to one embodiment, the lift percentage may be dynamically adjusted during the offer targeting process.

In step 114, it may be determined whether there are any more offers that have not been assigned. If so, the process may loop back to step 102 to identify the highest priority offer in the remaining offers and go through the offer assignment and re-prioritization process again. If there are no unassigned offers left, the offer rules may then be recorded in step 116. The specific associations between the offers and the customer populations may be built into an offer rule set for delivery to subsequent offer management process.

Figure 3:
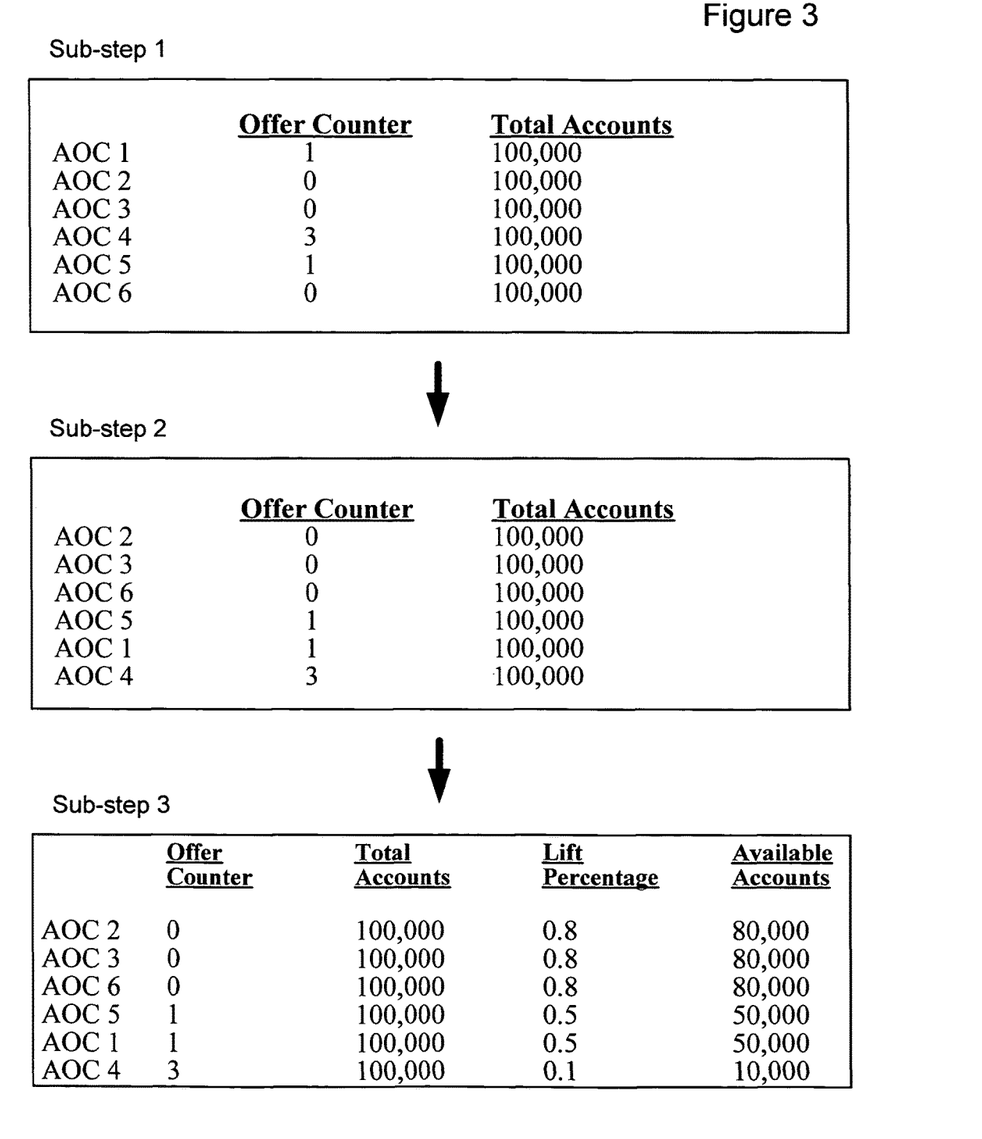
FIG. 3 is a flow chart illustrating exemplary sub-steps for offer targeting according to an embodiment of the present invention.

FIG. 3 is a flow chart illustrating exemplary sub-steps for offer targeting according to an embodiment of the present invention. In this example, six groups (AOC1-AOC6) are being considered for offer targeting. Each of the groups has 100,000 accounts. At the particular moment of Sub-step 1, some of the groups have already been assigned offers while others have not. The Offer Counter column lists the number of offers each group has received so far. Then in Sub-step 2, the groups are sorted based on their offer counter values. The groups with low offer counters are ranked higher than those with high offer counters. Next, in Sub-step 3, lift percentages are applied to the groups. The product of a group's total number of accounts and the corresponding lift percentage is the number of accounts remaining available for targeting in that group. For example, AOC4 has an offer counter of 3. After a lift percentage of 0.1 is applied to AOC4's total number of accounts, the number of available accounts toward the requested volume is 100,000*0.1=10,000. Subsequent offer assignment may be based on the results illustrated. Specifically, the next offer will be assigned by selecting groups in the order of their offer counter rankings with their available number of accounts taken into account. These sub-steps may be repeated until all offers have been processed.

The exemplary method for offer targeting as described above may be implemented with a computer-based system. The system may comprise a user interface, one or more processors, and storage devices. The offers and related rules may be provided through the user interface or via data links to various databases. The one or more processors may execute the offer targeting algorithm and record the generated rules in the storage devices. Alternatively, the exemplary method for offer targeting may be implemented in a functional module as part of an offer management system. The functional module may receive the offers and rules from upstream processes of the offer management system, run an offer targeting routine and pass on the generated rules to downstream processes.

Further, it should be appreciated that the method for offer targeting is not limited to communication through a statement channel. It is applicable or adaptable to other communication channels (e.g., E-mails, plastics, letters, telemarketing scripts and the like) through which individualized or customized offers are delivered.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. For example, the above-described method for offer targeting may be achieved through linear programming, nonlinear programming, goal programming, integer programming, constraint programming, and stochastic programming. Accordingly, such modifications are considered within the scope of the invention as intended to be encompassed by the following claims and their legal equivalents.

What is claimed is:

1. A computer-implemented method for offer targeting to a plurality of groups, the method maximizing offer distribution and controlling an envelope weight based on an envelope weight limit for mailing a plurality of offers to each group, the method comprising:

storing, in one or more storage devices, computer-readable information associated with the plurality of offers and the plurality of groups, wherein at least some of the plurality of groups comprise multiple accounts and each offer has a priority;

maintaining, by a data processor in communication with the one or more storage devices and having access to at least a portion of the computer-readable information, an offer counter for each of the plurality of groups, the offer counter for each group tracking a number of offers received by each group;

implementing the data processor to perform steps including:

identifying a highest priority offer for assignment;

performing an assignment process by assigning the identified offer to at least one qualified group by:

selecting, based on an offer counter ranking of each of the plurality of groups, one or more prequalified groups for receiving the selected offer, wherein a group having received the fewest offers has a highest ranking for selection;

assigning the selected offer to the selected one or more prequalified groups from the plurality of groups, wherein the one or more prequalified groups are pre-qualified for the selected offer based on a plurality of business rules;

incrementing offer counters associated with the one or more selected prequalified groups receiving the offer;

sorting and ranking the plurality of groups based on the incremented offer counters;

modifying a number of available accounts within at least one of the groups based on a pre-determined lift percentage due to the envelope weight limit;

determining whether any additional offer is available for assignment;

repeating all of the steps of the assignment process when any additional offer is available for assignment, the processor recording the assignment of the plurality of offers accomplished through assignment process to the plurality of groups, wherein the assigned offers are physically inserted into an envelope for each group, such that the total envelope weight does not exceed the envelope weight limit when including each of the assigned offers;

recording, in a storage device, the assignment of the plurality of offers accomplished through the assignment process to the plurality of groups; and dynamically adjusting the lift percentage during the offer assignment process based on an actual number of offers that are inserted into the envelope, wherein the actual number of offers that are inserted into the envelope is determined by an actual envelope weight.

2. The method according to claim 1, further comprising determining when a targeting volume has been reached for the identified offer and when the targeting volume has been reached, discontinuing the identified offer, wherein the targeting volume is defined by assignment to a predetermined number of accounts.

3. The method according to claim 1, wherein the offer targeting is performed one or more times for a predetermined time period and the offer counter for each of the plurality of groups is maintained for the predetermined time period.

4. The method according to claim 1, wherein a first group with a higher offer counter value has a lower offer counter ranking than a second group with a lower offer counter value such that the second group has a higher priority than the first group in receiving a subsequently assigned offer.

5. The method according to claim 1, wherein the predetermined lift percentage is associated with the offer counter value of the at least one of the one or more groups.

6. The method according to claim 1, wherein at least part of the plurality of offers are associated with one or more financial products.

7. The method according to claim 1, wherein at least part of the plurality of offers are associated with one or more insurance products.

8. A computer-based system for offer targeting to a plurality of groups, the system maximizing offer distribution and controlling an envelope weight based on an envelope weight limit for mailing a plurality of offers to each group, the system comprising:

a computer memory for storing and accessing computer-readable information associated with the plurality of offers and the plurality of groups, wherein at least some of the plurality of groups comprise multiple accounts and each offer has a priority;

at least one processor, the processor maintaining an offer counter for each of the plurality of groups, the offer counter for each group tracking a number of offers received by each group, the processor programmed to perform an assignment process by executing the following steps:

selecting one of the plurality of offers for assignment;

selecting, based on an offer counter ranking of each of the plurality of groups, one or more prequalified groups for receiving the selected offer from the plurality of groups based on an offer counter ranking and a number of available accounts within each group, wherein the selected one or more prequalified groups have a higher offer counter ranking than prequalified groups not selected;

assigning the selected offer to the one or more selected prequalified groups from the plurality of groups, wherein the one or more prequalified groups are pre-qualified for the selected offer based on a plurality of business rules;

incrementing offer counters associated with the one or more selected prequalified groups receiving the offer;

sorting and ranking the plurality of groups based on the incremented offer counters, wherein a first group with a higher offer counter value has a lower offer counter ranking than a second group with a lower offer counter value;

modifying a number of available accounts within at least one of the groups based on a pre-determined lift percentage due to the envelope weight limit;

determining whether any additional offer is available for assignment;

repeating all of the steps of the assignment process when any additional offer is available for assignment, the processor recording the assignment of the plurality of offers accomplished through assignment process to the plurality of groups, wherein the assigned offers are physically inserted into an envelope for each group, such that the total envelope weight does not exceed the envelope weight limit when including each of the assigned offers; and dynamically adjusting the lift percentage during the offer assignment process based on an actual number of offers that are inserted into the envelope, wherein the actual number of offers that are inserted into the envelope is determined by an actual envelope weight.

9. The system according to claim 8, wherein each of the plurality of offers is assigned to at least a predetermined number of accounts.

10. The system according to claim 9, further comprising terminating assignment of an offer if the offer has been assigned to at least the predetermined number of accounts.

11. The system according to claim 8, wherein the offer targeting is performed one or more times for a predetermined time period and the offer counter for each of the plurality of groups is maintained for the predetermined time period.

12. The system according to claim 8, wherein the predetermined order is associated with prioritization rankings of the plurality of offers.

13. The system according to claim 8, wherein a first group with a higher offer counter value has a lower offer counter ranking than a second group with a lower offer counter value such that the second group has a higher priority than the first group in receiving a subsequently assigned offer.

14. The system according to claim 8, wherein the predetermined lift percentage is associated with the offer counter value of the at least one of the one or more groups.

15. The system according to claim 14, wherein the steps further comprise adjusting the predetermined lift percentage.

16. The system according to claim 8, wherein at least part of the plurality of offers are associated with one or more financial products.

17. The system according to claim 8, wherein at least part of the plurality of offers are associated with one or more insurance products.

* * * * *